United States Patent [19]

Beavon

[11] 3,880,986

[45] Apr. 29, 1975

[54] PROCESS FOR THE CONVERSION OF HYDROGEN SULFIDE IN GAS STREAMS OF LOW HYDROGEN SULFIDE CONCENTRATION TO SULFUR

[75] Inventor: David K. Beavon, Pasadena, Calif.

[73] Assignee: The Ralph M. Parsons Company, Los Angeles, Calif.

[22] Filed: July 9, 1973

[21] Appl. No.: 377,448

[52] U.S. Cl. .................................. 423/574; 423/576
[51] Int. Cl. ............................................ C01b 17/04
[58] Field of Search ....... 423/543, 574, 576; 23/278

[56] References Cited
UNITED STATES PATENTS

| | | | |
|---|---|---|---|
| 1,904,512 | 4/1933 | Nordlander | 423/543 |
| 2,630,375 | 3/1953 | Miller | 423/576 |
| 2,726,933 | 12/1955 | Merriam et al. | 423/543 |
| 3,149,916 | 8/1964 | Schachenmeier et al. | 423/543 |
| 3,317,281 | 5/1967 | Grekel | 423/576 |

Primary Examiner—G. O. Peters
Attorney, Agent, or Firm—Christie, Parker & Hale

[57] ABSTRACT

A gas stream containing hydrogen sulfide in low concentrations is indirectly heated to a temperature sufficient for the catalytic conversion through elemental sulfur by reaction with sulfur dioxide by the Claus process. Simultaneously, a sulfur dioxide containing gas streams is generated by combustion of sulfur with an oxygen containing gas in a flame zone, the sulfur being present in excess of that required to meet the sulfur dioxide requirements of the gas stream.

Following recovery of excess sulfur from the combustion products from the flame zone, the gas streams are combined and pass over one or more Claus catalyst conversion stages where sulfur is formed by reaction of hydrogen sulfide with sulfur dioxide and recovered between each stage.

13 Claims, 1 Drawing Figure

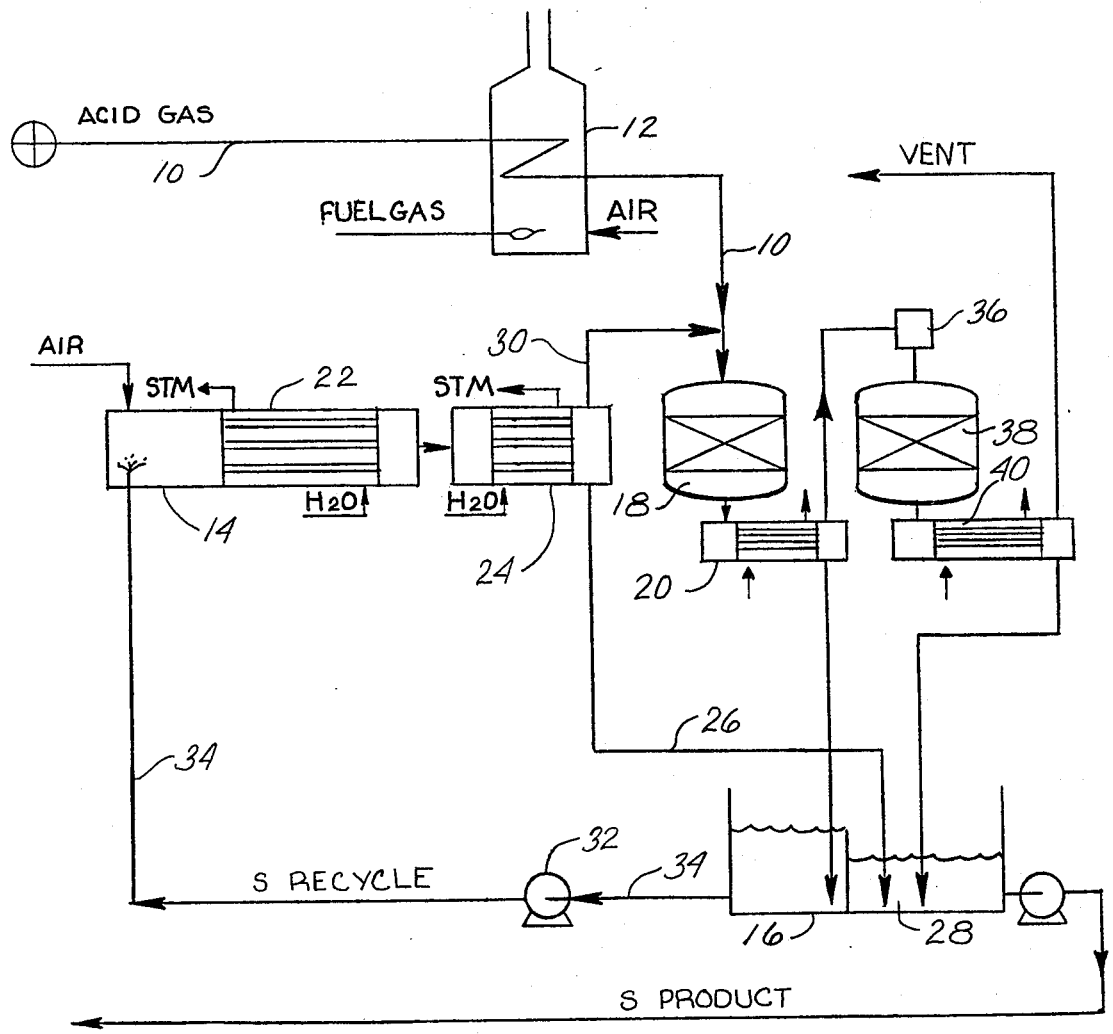

PROCESS FOR THE CONVERSION OF HYDROGEN SULFIDE IN GAS STREAMS OF LOW HYDROGEN SULFIDE CONCENTRATION TO SULFUR

BACKGROUND OF THE INVENTION

The modified Claus process for converting hydrogen sulfide sulfur in well-known and widely practiced. In most situations, process starts the feed gas containing a major portion of hydrogen sulfide (50% or more), in admixture with other gases which are for the most part inert.

The most commonly encountered inert gas is carbon dioxide. Because carbon dioxide is acidic as is hydrogen sulfide, both tend to be absorbed together by treating solutions which concentrate the hydrogen sulfide prior to contact with the Claus conversion unit.

Treating solutions commonly used are aqueous solutions of an amine such as monothanolamine and diethanolamine, diisopropanolamine and the like organic solvents such as sulfolane, N-methylpyrrolidone, polyglycols and the like as well as inorganic solvents such as potassium carbonate.

The hydrogen sulfide together with the carbon dioxide are normally stream stripped from the solvent employed to produce the feed gas for a Claus conversion system.

Since the hydrogen sulfide and carbon dioxide are usually present in a gas consisting mainly of hydrogen or hydrocarbons, some of the hydrogen and hydrocarbons will dissolve in the solvent and be re-extracted with the hydrogen sulfide and carbon dioxide.

Thus, depending upon feed gas composition, operating conditions and the nature of the solvent employed the hydrocarbon content of the "acid gas" (mixture of sulfur hydrogen sulfide and carbon dioxide) can range from 0.2 to 5 volume percent or more.

If an amine or an organic solvent is employed, the solvent because it has an appreciable vapor pressure will appear also in the acid gas in minor quantities.

Hydrocarbons and solvent vapors under adverse conditions cause serious problems in the operation of a modified Claus plant due to degradation of the carbonaceous materials to tarry products, which may foul the Claus catalyst, rendering it inactive, or contaminate the product sulfur rendering it off color, sometimes to a degree where it is not merchantable.

When the concentration of hydrogen sulfide in the acid gas is above 50%, it is possible to operate a modified Claus plant on a straight through basis, in which all the gas is combined with the requisite quantity of oxygen, normally provided by air, in a combustion chamber.

The reaction of hydrogen sulfide with oxygen to form sulfur dioxide and sulfur is exothermic resulting in a flame temperature sufficiently high to completely convert the hydrocarbons and solvent vapors to products such as carbon dioxide, carbonyl sulfide and carbon disulfide. Under these conditions, the formation of tars can be avoided.

However, if the concentration of hydrogen sulfide in the gas stream is below 50% by volume, flame temperatures are reduced by the thermal burden of the inert carbon dioxide and gasification of the carbon compounds may be incomplete and tarry products formed.

Under such conditions, it is necessary to raise the flame temperature by bypassing a portion of the acid gas around the flame zone and introducing the bypassed portion at a point just before the first catalyst stage of the Claus plant.

As the acid gas becomes progressively dilute with respect to hydrogen sulfide content, more must be bypassed around the flame zone in order to maintain the flame temperatures sufficiently high to gasify the carbon compounds, to maintain flame stability and avoid extinguishing.

Bypassing, however, can only be practiced up to a point when two-thirds of the acid gas is bypassed while one-third is passed through the flame zone.

These proportions are limiting because the Claus reaction, as is well-known, requires one part by volume of sulfur dioxide for each two parts by volume hydrogen sulfide.

Thus, even if two-thirds of the acid gas is bypassed around the flame zone while one-third is passed through the flame zone, a lower limit of hydrogen sulfide concentration is reached where the flame temperature becomes too low for stable combustion or when tarry products are formed.

This lower limit is reached when the hydrogen sulfide concentration of the acid gas stream is from about 15–20 volume percent.

In addition, as the concentration of the hydrogen sulfide in the gas stream is reduced, the difficulties presented by the presence of hydrocarbons and/or solvent vapors in the acid gas become aggravated. For example, if the acid gas contains 0.5% of volume of hydrocarbons, the proportion of hydrogen sulfide to hydrocarbons is 180 to 1 if the acid gas contains 90% hydrogen sulfide. On the other hand, the proportion of hydrogen sulfide to hydrocarbon is only 20 to 1 if the acid gas only contains 10% hydrogen sulfide.

Thus, as the concentration of hydrogen sulfide in the acid gas diminishes, the proportional fraction of hydrocarbons and/or solvent vapors becomes much larger, while at the same time flame temperature is decreasing. As a consequence, the potential for gasification of the hydrocarbons becomes more difficult.

Based on these considerations, it has been generally concluded that the modified Claus process is not suited for acid gases containing less than about 20% hydrogen sulfide by volume.

This presents a serious problem because there are many acid gases produced, such as for instance, in the purification of natural gas, which have low hydrogen sulfide concentrations. Up to now, it has been the general practice to flare the acid gases with resultant pollution of the atmosphere by sulfur dioxide.

Some installations, for instance, employing a flaring operation are emitting 1,000 tons a day sulfur dioxide to the atmosphere.

The situation has the potential of becoming more aggravated since in many processes for the conversion of coal to low sulfur gas or liquid fuels results in a production of an acid gas containing less than 20% by volume hydrogen sulfide.

SUMMARY OF THE INVENTION

According to the present invention there is provided a process for the production of sulfur from gases of low hydrogen sulfide content, in particular, acid gases containing less than 20% by volume hydrogen sulfide.

The process involves preheating a hydrogen sulfide containing gas which is low in hydrogen sulfide content by heat exchange in a substantial absence of sulfur dioxide and oxygen to a temperature from about 400°F to about 650°F for combining with a sulfur dioxide containing gas stream for feed to a conventional Claus sulfur conversion catalyst.

There is also produced a sulfur dioxide containing gas in which the sulfur dioxide content is approximately equal to half the volume of the hydrogen sulfide contained in the hydrogen sulfide lean gas stream. This is accomplished by burning sulfur produced in the process in a flame zone, preferably the initial sulfur formed as a consequence of the reaction of hydrogen sulfide in the acid gas with sulfur dioxide, in the presence of an oxygen containing gas, typically air, with sulfur being present in an amount at least 25% greater than the amount required for conversion to sulfur dioxide.

By employing excess sulfur, flame temperature in the flame zone can be held in the range of 2,100°F to 2,800°F, while at the same time hydrocarbon impurities contained in the sulfur are reacted with sulfur to form carbon-sulfur compounds and hydrogen sulfide.

After combustion of sulfur, the gas stream is cooled to a temperature of from about 270°F to 750°F to condense the excess sulfur present.

The resultant sulfur dioxide containing gas stream is then admixed with the heated gas stream of low hydrogen sulfide content and passed over Claus conversion catalyst, typically an alumina catalyst, where sulfur is formed by reaction of hydrogen sulfide with sulfur dioxide.

The sulfur which is formed is recovered from the gas stream by condensation. A portion is recovered as product and the balance recycled back to the flame zone for conversion to sulfur dioxide and purification of sulfur.

In carrying out the process of this invention, sulfur may be continuously purified while at the same time through the use of excess sulfur in the flame zone, both oxygen and sulfur trioxide are eliminated from the sulphur dioxide containing gas stream. This avoids the conversion of the catalyst to its sulfate state and avoids, thereby, its deactivation for the Claus reaction. In addition, in maintaining the gas stream of low hydrogen sulfide content at a relatively low temperature, the formation of contaminating tarry materials is prevented.

THE DRAWING

The attached drawing schematically illustrates one technique for carrying out the process of this invention.

DESCRIPTION

According to the present invention there is provided a process for the product of sulfur from gas streams of low hydrogen sulfide content.

The gas streams of low hydrogen sulfide content processed in accordance with this invention may be termed for convenience "acid gas." By the term "acid gas" as used herein, there is meant a gas stream containing less than about 20% by volume hydrogen sulfide, the balance of the gas stream being substantially inert due to the presence of carbon dioxide and water. It may contain some entrained hydrogen, hydrocarbons, organic absorbents and the like, but is substantially free of sulfur dioxide and oxygen.

With reference now to the drawing, the acid gas is passed by line 10 through preheater 12, where through combustion of a fuel gas with air, the acid gas is indirectly heated to a temperature suitable for conversion of the hydrogen sulfide contained in the acid gas to sulfur. This temperature in general, will range from about 400°F to about 650°F. By controlling the temperature to which the acid gas is heated in preheater 12, and by avoiding the presence of oxidized materials such as sulfur dioxide and oxygen, no tarry materials are formed from the hydrocarbons or organic absorbents contained in the acid gas.

Simultaneous with the preheating of the acid gas, there is formed a sulfur dioxide gas stream by the combustion of sulfur to the presence of oxygen containing gas, typically air, in flame zone 14. The sulfur fed to flame zone 14 is sulfur produced in the process, and preferably sulfur formed as a consequence of the first stage of reaction of hydrogen sulfide with sulfur dioxide to form sulfur by the reaction $$2H_2S + SO_2 \rightarrow 3S + 2H_2O \qquad (1)$$
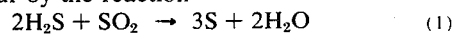

Although there need only be consumed in flame zone 14 sufficient sulfur to provide sulfur dioxide in an amount equal to one-half of the volume of the hydrogen sulfide contained in the acid gas, the amount of sulfur fed to flame zone 14 is always in excess of that required to meet the sulfur dioxide requirements of the hydrogen sulfide lean acid gas.

In particular, the amount of the sulfur is at least about 25% in excess of the amount of sulfur required to produce a stoichiometric amount of sulfur dioxide for reaction with hydrogen sulfide and may range, depending upon operating conditions, from about 25% to about 200% in excess of the amount of sulfur required for the generation of sulfur dioxide for reaction with hydrogen sulfide. In the combustion of sulfur, the oxygen containing gas typically used is air, and sulfur dioxide is formed by the reaction:

$$S + O_2 (Air) \rightarrow SO_2 (+N_2) \qquad (2)$$

By employing sulfur as opposed to a portion of the acid gas as the feed to the flame zone, flame zone 14 is not influenced by the properties of the acid gas. Rather, it is continuously fed with essentially constant quality, elemental sulfur and air. As a result, it can always be operated at high temperatures which permit essentially complete reaction of the oxygen introduced with sulfur, and any carbonaceous materials which may be present as impurities in the sulfur.

To this extent, it is preferred that the sulfur fed to flame zone 14 be provided from a separate sulfur bin 16, which is employed to collect the sulfur initially produced by the reaction of hydrogen sulfide, and sulfur dioxide in Claus reactor 18 which is, in turn condensed from the resultant gas stream in condenser 20.

Since the acid gas stream is substantially free of oxygen and sulfur dioxide and is not heated to a temperature at which tarry materials will form from the carbonaceous impurities, they can be conveniently condensed with the initial sulfur produced. By collecting the sulfur as well as the entrained carbonaceous impurities in a separate liquid sulfur bin 16, the sulfur can be used for the generation of sulfur dioxide, as well as safe elimination of carbonaceous materials. Through control of combustion temperature, the carbonaceous materials can be readily reacted with sulfur to form carbon-sulfur compounds by reaction such as:

$$C_n H_{2n} + 3n\, S \rightarrow n\, CS_2 + n\, H_2S \qquad (3)$$

Complete conversion of hydrocarbon impurities retained in sulfur is assured by maintaining the temperature in the flame zone at a high level above 2,000°F. Preferably, the temperature should range from about 2,100°F to about 2,800°F, the upper limit being dictated by the ability of the materials of construction used in the flame zone such as fire brick to withstand flame temperatures.

In addition to achieving purification of the sulfur fed to flame zone 14, the use of excess sulfur also permits the temperature within flame zone 14 to be modulated since sulfur in excess of that required for reaction with the oxygen fed to flame zone 14, and when present, carbonaceous impurities absorbs the exothermic heat of reaction to control flame zone temperature. This is accomplished by revaporization of the excess sulfur.

The use of excess sulfur has another important advantage. Excess sulfur assures complete consumption of oxygen and reduces to a minimum the formation of sulfur trioxide. Both oxygen and sulfur trioxide are undesirable constituents in a sulfur dioxide gas fed to a Claus catalyst, particularly alumina, as both cause the formation of alumina sulfate which deactivates the catalyst as a promoter for the Claus reaction.

By employing sulfur alone as the principal feed to flame zone 14, it has been found that the amount of sulfur trioxide produced is about 0.84 mol for each 1 MM mols of sulfur dioxide formed. This corresponds to, or is less than the amount of sulfur trioxide normally produced when a high hydrogen sulfide containing gas is converted to sulfur dioxide for feed to a Claus operation in a conditional manner.

Thus, by employing excess sulfur which drives the reaction:

$$S + 2SO_3 \rightarrow 3SO_2 \qquad (4)$$

at elevated temperatures, the amount of sulfur trioxide present in the resultant gas stream is held to a level at or below that which is typically fed to sulfur plant.

As previously pointed out, production of sulfur dioxide at temperatures of about 2,000°F or higher assures complete conversion of carbonaceous impurities to carbon-sulfur compounds. Because the acid gas of low hydrogen sulfide concentration is kept below a temperature at which tarry materials can be formed from the carbonaceous materials present in the acid gas, a situation is not reached where tarry materials are formed which could lead to off color product and more importantly catalyst degradation.

Following combustion of sulfur and conversion of any entrained carbonaceous materials in flame zone 14, the gas stream from flame zone 14 is passed through waste heat boiler 22 where the gas stream is partially cooled and steam generated for use in the process. The gas stream is then passed through the first condenser 24, where excess sulfur, in now a highly purified state, is condensed from the gas stream, and fed by line 26 to product sulfur bin 28 or sulfur collection zone.

To accomplish condensation of excess sulfur fed to flame zone 14, the gas stream is cooled from a temperature of about 270°F to about 750°F depending upon operating conditions and process economics.

The cooled resultant gas stream consisting of sulfur dioxide, nitrogen where air is employed as the source of oxygen, traces of carbonyl sulfide, carbon disulfide, and carbon dioxide originating from any carbonaceous materials present in the sulfur and uncondensed sulfur vapors are passed by line 30 for admixture with the preheated gas passing by line 10 to reactor 18. Reactor 18 contains a conventional Claus catalyst, such as bauxite, alumina and the like.

The combined gas streams are fed to Claus reactor 18 at a temperature in a range of about 430°F to about 500°F.

This, as indicated, necessitates preheating of the acid gas to a temperature from about 400°F to about 650°F, preferably from about 430°F to about 500°F depending upon the temperature to which the sulfur dioxide containing gas streams is cooled during a sulfur condensation.

In preheating the acid gas, it is desired that the gas be substantially free of oxygen and sulfur dioxide in order to avoid the formation of tarry products. In the event oxygen and/or sulfur dioxide are present, temperatures above 750°F should be avoided. This can be assured by indirect heating of the acid gas as in fired heater 12.

The following reaction of hydrogen sulfide and sulfur dioxide in reactor 18, in which % conversion to elemental sulfur may be as high as 80% or more, the formed sulfur is condensed in condensor 20, and passed to liquid sulfur bin 16. A portion is passed to product sulfur bin 28 as overflow, and the balance recycled by pump 32 for feed by line 34 to flame zone 14.

After sulfur condensation, the balance of the gas stream may then be reheated in reheater 36 for passage to a next Claus conversion unit 38, where additional sulfur is formed and condensed by condensor 40, and passed to product sulfur bin 28.

Since any carbonaceous materials retained by the sulfur are collected in sulfur bin 16, the product from reactor 38 or any additional Claus reactors employed will be high purity and can be readily combined with the purified sulfur condensed in condensor 24.

The residual gas stream containing minor amounts of hydrogen sulfide and sulfide dioxide is either incinerated then vented to the atmosphere or passed to a system for elimination of sulfur compounds so the gas can be safely vented to the atmosphere without creating problems of air pollution.

EXAMPLE

An acid gas containing 7.4 mol % $H_2S$, 1.9 mol % $CH_4$, 84.65 mol % $CO_2$, 6.2 mol % $H_2O$ and trace quantities of monoethanolamine is fed to a fired preheater at a rate of 8,374 lb. mol/hr and indirectly heated to a temperature of between 450°F and 500°F.

To provide sufficient sulfur dioxide for reaction with the hydrogen sulfide contained in the acid gas stream liquid, sulfur is fed at the rate of 24,412 lbs/hr to a flame zone with sufficient air to convert 9,933 lbs/hr of the sulfur to sulfur dioxide. The amount of excess sulfur is 14,479 lbs/hr or 146% in excess of that required to form the sulfur dioxide for reaction with hydrogen sulfide through the use of excess sulfur. The excess sulfur maintains the temperature in the flame zone at 2,106°F.

After conversion of sulfur to sulfur dioxide, the gas stream is cooled to 450°F at which 12,680 lbs/hr of liquid sulfur is condensed as product sulfur.

The gas stream is then combined with the heated acid gas and passed over a Claus conversion catalyst where sulfur is formed by the reaction:

$$2H_2S + SO_2 \rightarrow 3S + 2H_2O \qquad (1)$$

The gas stream is then cooled and liquid sulfur condensed at the rate of 27,495 lbs/hr. Of this, 3,083 lbs/hr is separated as product sulfur and the balance recycled to the flame zone for sulfur dioxide generation and sulfur purification. On the basis of the hydrogen sulfide contained in the acid gas, about 79.5% is converted in the first Claus stage to free sulfur.

The gas stream from the condensor is then reheated to 500°F and passed to a second catalytic Claus conversion zone where additional sulfur is formed and condensed as product sulfur.

What is claimed is:

1. A process for the production of sulfur from acid gas streams of low hydrogen sulfide concentration and which contain carbonaceous impurities which comprises;
   a. indirectly heating the acid gas stream of low hydrogen sulfide concentration to a temperature of from about 400°F to about 650°F to prevent conversion of the carbonaceous impurities to prevent the formation of tarry materials from the carbonaceous impurities;
   b. generating a sulfur dioxide gas stream by the combustion of sulfur containing carbonaceous impurities in the presence of an oxygen containing gas in a high temperature flame zone, the amount of oxygen fed to said flame zone being sufficient to generate sulfur dioxide in an amount equal to about 50% of the hydrogen sulfide contained in the acid gas stream of low hydrogen sulfide concentration and the amount of sulfur fed to said flame zone being at least about 25% greater than the amount required for conversion to sulfur dioxide to prevent the formation of sulfur trioxide and convert contained carbonaceous impurities to gaseous carbon-sulfur compounds;
   c. cooling the sulfur dioxide gas stream to a temperature of from about 270°F to about 750°F to condense excess sulfur free of carbonaceous impurities from the sulfur dioxide gas stream;
   d. combining the heated acid gas stream of low hydrogen sulfide concentration with the cooled sulfur dioxide gas stream and catalytically converting the combined hydrogen sulfide and sulfur dioxide to elemental sulfur without converting the carbonaceous impurities to tarry materials;
   e. condensing the formed elemental sulfur with entrained carbonaceous impurities from the gas stream and recycling a portion of the formed elemental sulfur containing the carbonaceous impurities to said flame zone.

2. A process as claimed in claim 1 in which the flame zone is maintained at a temperature above about 2,000°F.

3. A process as claimed in claim 1 in which the flame zone is maintained at a temperature from about 2,100°F to about 2,800°F.

4. A process as claimed in claim 1 in which the acid gas stream is heated to a temperature from about 430°F to about 500°F.

5. A process as claimed in claim 3 in which the acid gas stream is heated to a temperature from about 430°F to about 500°F.

6. A process for the production of sulfur from acid gas streams of low hydrogen sulfide concentration and which contains carbonaceous impurities which comprises:
   a. indirectly heating acid gas stream of low hydrogen sulfide concentration to a temperature of from about 400°F to about 650°F to prevent the conversion of carbonaceous impurities to tarry materials;
   b. generating a sulfur dioxide gas stream by the combustion of sulfur containing carbonaceous impurities in the presence of an oxygen containing gas in a high temperature flame zone, the amount of oxygen fed to said flame zone being sufficient to generate sulfur dioxide in an amount equal to about 50% of hydrogen sulfide contained in the acid gas stream of low hydrogen sulfide concentration and the amount of sulfur fed to said flame zone being at least about 25 percent greater than the amount required for conversion to sulfur dioxide to prevent the formation of sulfur trioxide and to convert the contained carbonaceous impurities to carbon sulfur compounds;
   c. cooling the sulfur dioxide gas stream to a temperature of from about 270°F to about 750°F to condense excess sulfur from the sulfur dioxide gas stream and passing the condensed excess sulfur to a first liquid sulfur collection zone;
   d. combining the heated acid gas stream of low hydrogen sulfide concentration with the cooled sulfur dioxide gas stream and catalytically converting the combined hydrogen sulfide and sulfur dioxide to elemental sulfur;
   e. condensing the formed elemental sulfur with entrained carbonaceous impurities from the gas stream leaving a residual gas stream;
   f. collecting the formed elemental sulfur as liquid sulfur containing the carbonaceous impurities in a second liquid sulfur collection zone;
   g. recycling liquid sulfur containing the carbonaceous impurities from said second liquid sulfur collection zone to said flame zone in an amount sufficient to meet the sulfur requirements of said flame zone.

7. A process as claimed in claim 6 in which the residual gas stream is passed to at least one additional catalytic sulfur conversion stage and the sulfur formed is condensed and collected in said first liquid sulfur collection zone.

8. A process as claimed in claim 6 in which the flame zone is maintained at a temperature above about 2,000°F.

9. A process as claimed in claim 7 in which the flame zone is maintained at a temperature above about 2,000°F.

10. A process as claimed in claim 6 in which the flame zone is maintained at a temperature from about 2,100°F to about 2,800°F.

11. A process as claimed in claim 7 in which the flame zone is maintained at a temperature from about 2,100°F to about 2,800°F.

12. A process as claimed in claim 6 in which the acid gas stream is heated to a temperature from about 430°F to about 500°F.

13. A process as claimed in claim 7 in which the acid gas stream is heated to a temperature from about 430°F to about 500°F.

* * * * *